United States Patent [19]

Evans

[11] 3,997,999
[45] Dec. 21, 1976

[54] MOSQUITO TRAP

[76] Inventor: Ralph Carlysle Evans, 11241 - 3rd Ave., Gulf Marathon, Fla. 33050

[22] Filed: Mar. 25, 1976

[21] Appl. No.: 670,426

[52] U.S. Cl. .................................................. 43/107
[51] Int. Cl.² ....................................... A01M 1/10
[58] Field of Search .............. 43/107, 118, 58, 60, 43/64, 65; 119/1, 3

[56] References Cited

UNITED STATES PATENTS

| | | | |
|---|---|---|---|
| 1,974,549 | 9/1934 | Spencer et al. | 43/107 |
| 3,182,419 | 5/1965 | Zimmerman | 43/55 |

Primary Examiner—Warner H. Camp
Attorney, Agent, or Firm—Salvatore G. Militana

[57] ABSTRACT

A mosquito trap consisting of a receptacle containing water and having two chambers separated by a screen member. The first chamber is open to the atmosphere while the second chamber is enclosed and contains a food retaining member remote from the first chamber. The mosquito trap permits a female mosquito to lay its eggs in the water of the first chamber. The ensuing larvae will swim through the screen member to the second chamber in quest for the food. Upon growing larger and transforming into a pupa stage and then into a young adult mosquito, they become trapped to die in the second chamber as the screen openings are not of such size to permit the larvae, pupae or mosquitoes to escape back into the first open chamber.

5 Claims, 6 Drawing Figures

U.S. Patent   Dec. 21, 1976   Sheet 2 of 2   3,997,999
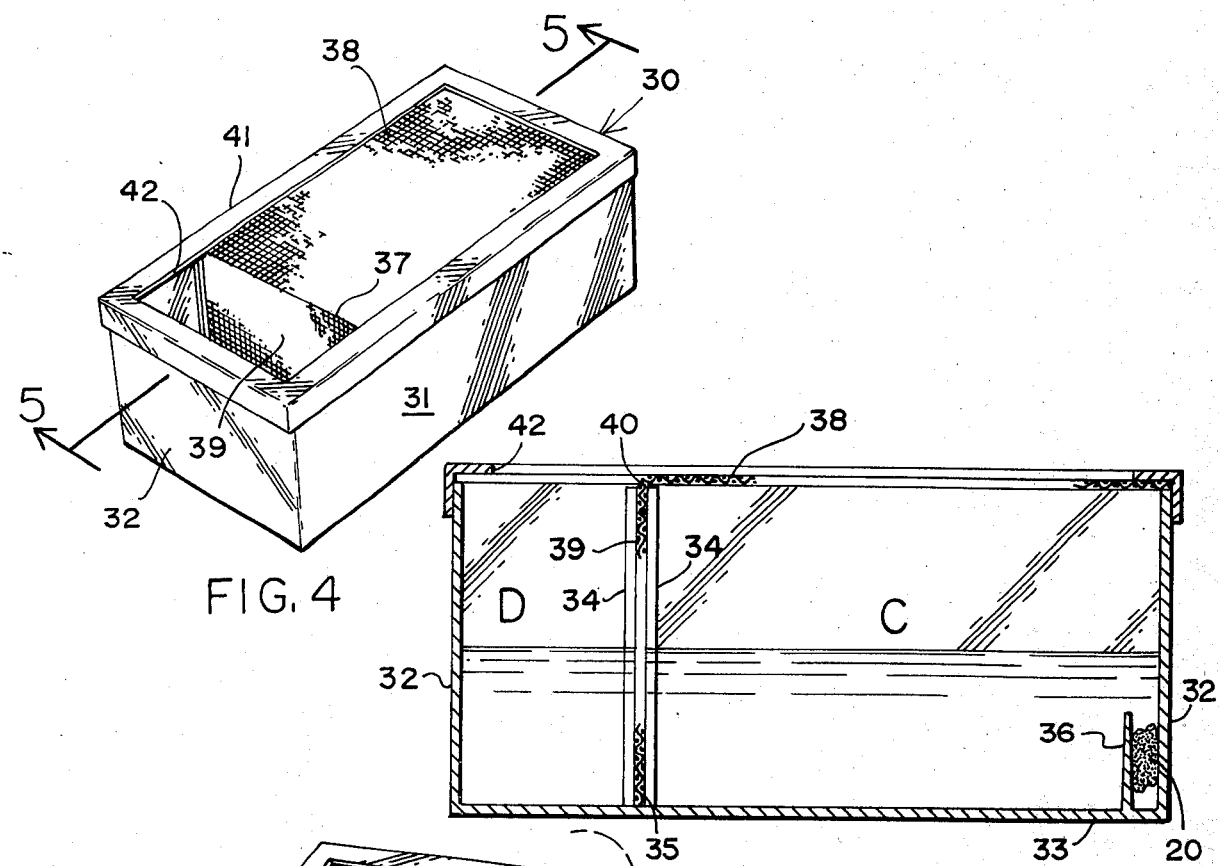
FIG. 4
FIG. 5
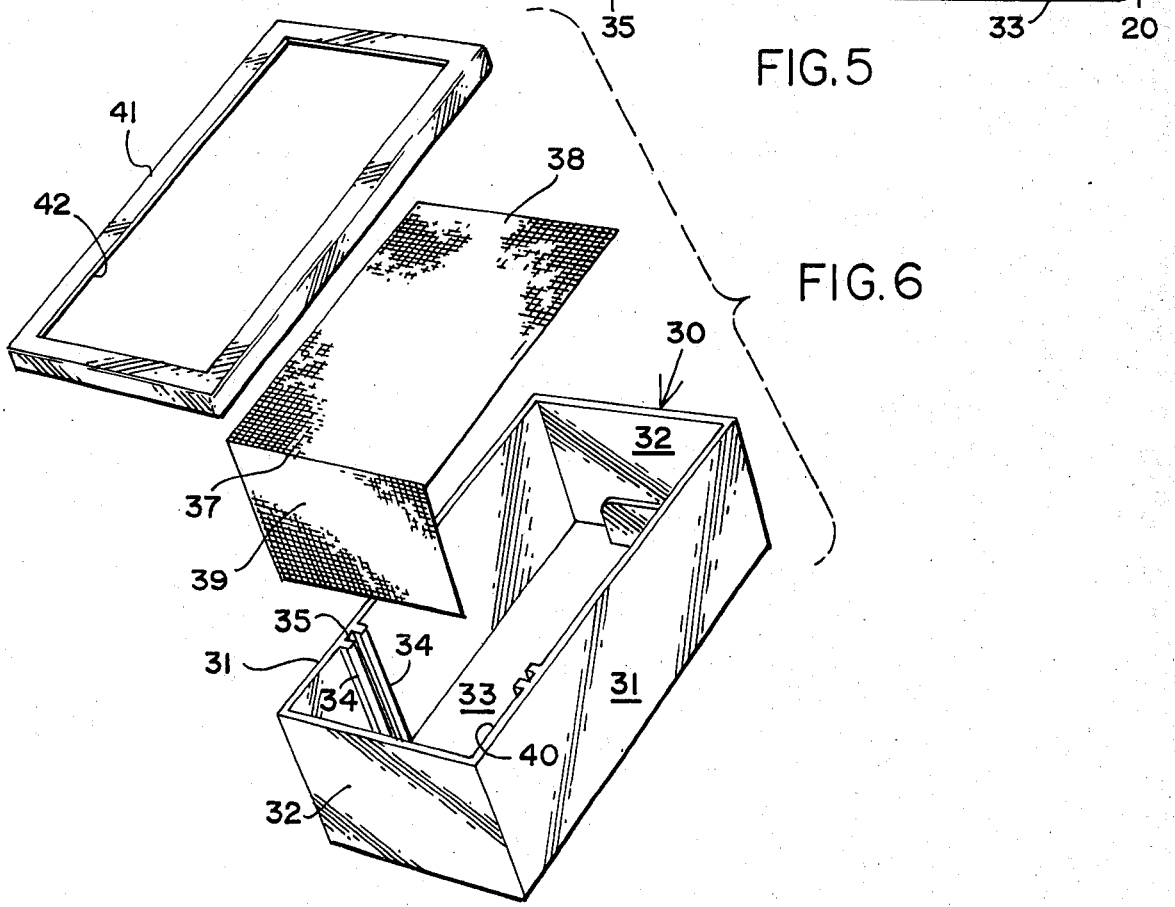
FIG. 6

MOSQUITO TRAP

BACKGROUND OF THE INVENTION

1. Field of the Invention

This invention relates to mosquito traps and is more particularly directed to one that traps the mosquito when in the larvae stage.

2. Description of the Prior Art

The mosquito is an amphibious insect; a part of its life is spent in water as larvae and pupae and later in life they take to the air as an adult mosquito. The mosquito life begins when the female mosquito lays its eggs on the surface of stagnant water. Larvae soon hatch out, swim in the water seeking minute water organisms as food. These organisms feed on organic food that is in the water. The larvae then transform into pupae in which a complete mosquito is grown to finally fly away. Development from a new egg to an adult mosquito takes from nine to fourteen days.

The conventional ways of destroying mosquito life are by the use of mosquito traps by spraying both the mosquitoes and the areas in which mosquitoes are breeding with insecticides and drying those areas in which stagnant water exists to prevent the breeding of mosquitoes. Mosquito traps for catching mosquitoes are rather inefficient devices and do no more than rid a limited enclosed area such as a room of mosquitoes. Spraying insecticides over areas to be freed of mosquitoes and stagnant waters are somewhat successful in eradicating the area of mosquitoes. However, in spite of the progress made by science in the use of insecticides and the care taken to prevent the existence of breeding areas for mosquitoes, the mosquito is far from having been made extinct. The danger of using certain insecticides that could destroy all mosquitoes would also destroy other forms of beneficial insects as well as being dangerous to human and animal life.

Therefore, it is the intent of the present invention to destroy mosquitoes by a different approach, namely, by the use of a trap which traps the mosquito when it is in its larvae stage and destroys the mosquito that ensues therefrom.

BRIEF SUMMARY OF THE INVENTION

Therefore, a principal object of the present invention is to provide a trap for mosquitoes that entices the female mosquito to lay its eggs in the trap and thereby effect the death of the mosquitoes that are produced by these eggs.

Another object of the present invention is to provide a mosquito trap that offers a desirable breeding ground for mosquitoes to a female mosquito wherein the mosquitoes are bred in the trap and readily killed.

A further object of the present invention is to provide a simple and inexpensive trap for eradicating mosquitoes, which trap is most effective to prevent the propagation of mosquitoes.

A still further object of the present invention is to provide a trap with a receptacle containing stagnant water and having an open and closed chamber separated by a screen, wherein larvae are permitted to breed in the open chamber, and food in the closed chamber causes the larvae to swim through the screen to the food, but cannot swim back to the open chamber, and thereby become trapped.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE SEVERAL VIEW OF THE DRAWINGS

In the drawings:

FIG. 4 is a perspective view of an alternate construction of my mosquito trap.

FIG. 5 is a cross sectional view taken along the line 5—5 of FIG. 4.

FIG. 6 is an exploded view thereof.

DETAILED DESCRIPTION OF THE PREFERRED EMBODIMENTS

Figure 1:
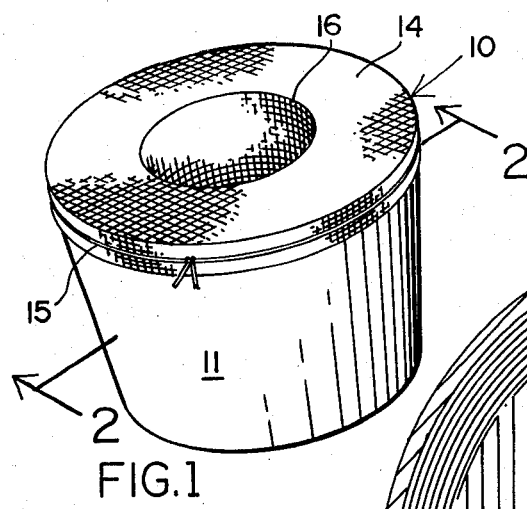
FIG. 1 is a perspective view of a mosquito trap constructed in accordance with my invention.
Figure 3:
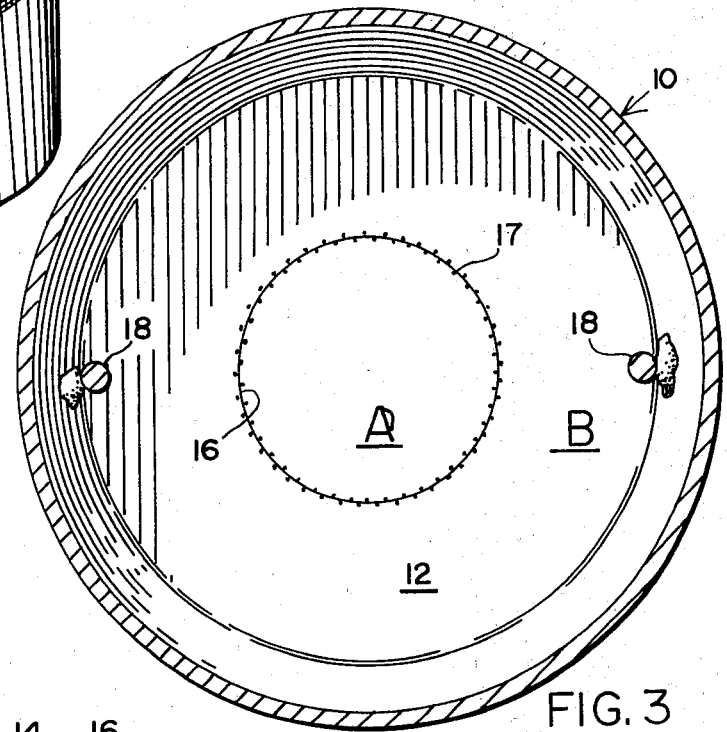
FIG. 3 is cross sectional view taken along the line 3—3 of FIG. 2.

Referring to the drawings wherein like numerals are used to designate similar parts throughout the several views, the numeral 10 refers to a mosquito trap constructed in accordance with my invention and consisting of a pail-like receptacle having an arcuate side wall 11 extending upwardly from a bottom wall 12. Across the open top of the receptacle 10 there extends a sheet of screening 14 that is turned downwardly at the top edge portion 13 of the side wall 11 forming a flange 19. A cord or wire 15 is wound about the flange 19 and its ends tied together to secure the screen 14 to the receptacle 10.

At the center portion of the wire or plastic screen 14 is an opening 16 whose edge portion is engaged by the second wire or plastic screen 17 formed into a cylinder and extending from the bottom wall 12. The arrangement of the screens 14 and 17 in the receptacle 10 as described hereinabove forms a pair of concentric chambers -A- and -B-. Chamber -A- is cylindrical chamber having screen 17 as its side wall, a bottom wall 12 and its top open to the atmosphere as at 16. Chamber -B- is enclosed and consists of a spaced and concentrically disposed solid side wall 11 and a screened side wall 17, the bottom wall 12 and a screened top wall 14. It is obvious that an insect such as a mosquito has a ready access to the chamber -A- through the opening 16 while there is no entry into and escape from the chamber -B- except through the screens 14, 17.

Within opposite sides of the receptacle 10 adjacent the side walls 11 is a pair of posts 18 behind which particles of food 20 used as bait for the larvae and mosquito may be wedged or otherwise secured.

Figure 2:
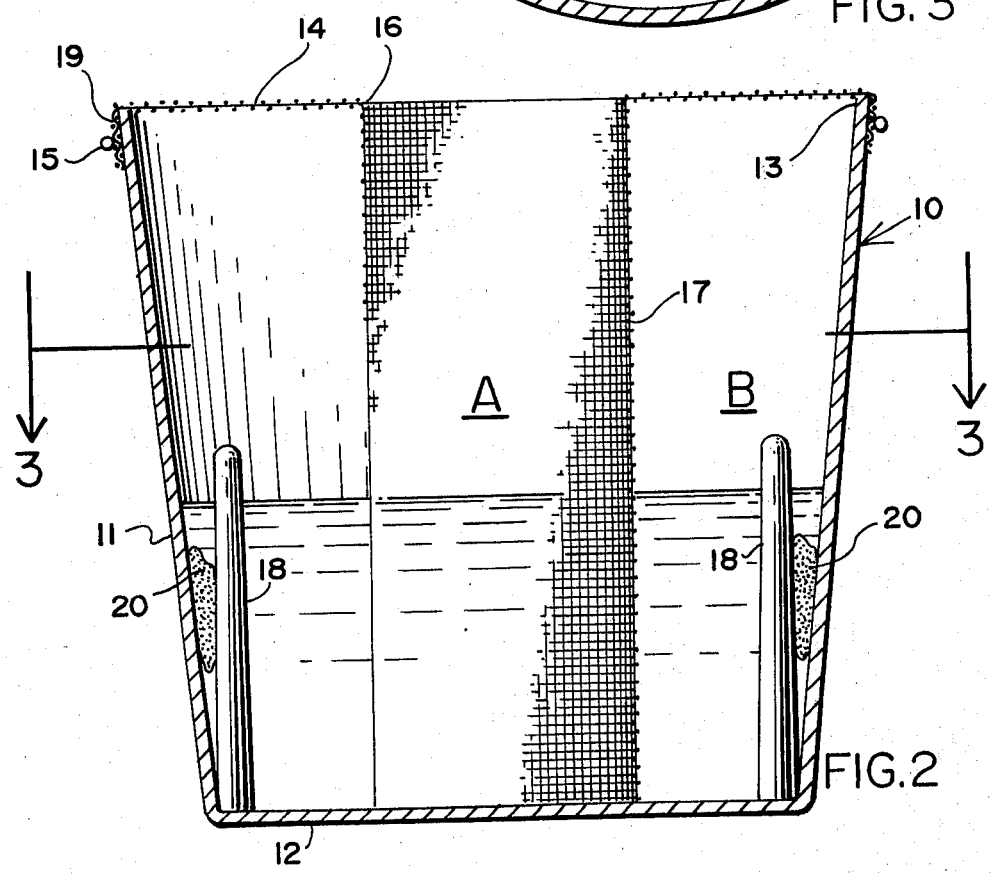
FIG. 2 is a longitudinal cross sectional view.

In making my device 10 ready for use as a trap for mosquitoes, the cord 15 is unfastened and the screen 14, 17 which is formed as a unit is lifted from its position in the receptacle 10. Water is poured into the receptacle 10 and food 20 wedged behind the posts 18 as best shown by FIG. 2. The combined screen 14, 17 is then returned to its position over and in the receptacle 10 and the cord 15 wound about the flanged portion 19 to secure the screen 14, 17 to the receptacle 10.

The mosquito trap 10 is now ready to be placed in an area that is to be cleared of mosquitoes. The female mosquito will find the stagnant water in the trap 10 to be an ideal place to lay her eggs. She will lay her eggs on the surface of the water after having passed through the central opening 16. She will lay a batch of from 50 to 200 eggs in her lifetime of from 10 days to one month. The eggs will float on the surface of the water in a cluster within the chamber -A-. Very soon thereafter, larvae or wrigglers will soon hatch out of the eggs and commence swimming around in search of food. They feed on minute organisms present in stagnant water and at this time they can swim through the screen 17 into chamber -B- to feed on the food 20; after about a days feeding, the larvae become too large to be able to swim back through the screen openings 17. The larvae then change to the pupae stage which consists of the beginning of the formation of an adult mosquito within a skin or shell. By this time all of the larvae will be found in the chamber -B- as the mosquito being formed needs food to grow to adult size when it leaves its pupa skin to fly off and start its blood thirst hunting life. Since the screens 14 and 17 are of such fine mesh as to permit the larvae to pass therethrough, it will not permit the grown larvae, pupae or the newly formed adult mosquito to pass, and thereby trap the mosquitoes in chamber -B-. Since the life span of the mosquito is short, the trapped mosquitoes will soon die. If it is desired to rebait the trap 10, the trapped mosquitoes can be killed by either burning, using insecticides or filling the receptacle 10 and drowning the trapped mosquitoes.

An alternate construction of my mosquito trap is shown by FIGS. 4–6 inclusive, the trap 30 consisting of a rectangular side walls 31, end walls 32 joined together at their edge portions and to a bottom wall 33 to form an open top container. In proximity of one end wall 32 there is a pair of spaced upright members 34 mounted on each of the side walls 31 to form a vertically disposed slotted portion 35. Adjacent to the other end wall 32 there is a plate 36 extending upright from the bottom wall 33 in close spaced relation to the end wall 32 to permit food 20 to be placed and wedged therebetween as bait for the organisms. The mosquitoes, in turn, feed on the organisms.

A screen member consisting of the screen bent as at 37 into an L-shape forming a top closure member 38 and a side closure member 39 is mounted on the receptacle 10. The side closure screen member 39 is slidably fitted into the slots 35 to rest on the bottom wall 33 while the top closure screen member 38 rests on the top edges of the side walls 31 and the end wall 32 as best shown by FIG. 5. The screen members 38, 39 form chambers -C- and -D-. Chamber -C- is completely enclosed forming a trap to prevent the escape of mosquitoes. Chamber -D- is open to the atmosphere as at 40; the chamber being formed by the end wall 32, screen member 39, portions of the side walls 31 and the bottom wall 33. To prevent the mosquitoes from escaping from the chamber -C- at the juncture of the screen member 38 and the top edges of the side walls 31 and end wall 32, there is provided a lid 41 that fits over the top portion of the receptacle 30. The lid 41 is provided with an opening 42 that permits access of the female mosquito to the opening 40 of the chamber -D-.

In order to prepare my mosquito trap 30 for use, the lid 41 is removed and the screen member 38, 39 slid upwardly along the slots 35. Water is poured in the receptacle 30 and food 20 is placed behind the plate member 36. The screen portion 39 is then fitted in the slots 35 and slid downwardly until the screen portion 38 rests on the top edges of the receptacle 30. The lid 41 is then replaced on the receptacle 30.

The stagnant water in the receptacle 30 will attract the female mosquitoes that will then enter the trap 30 via the openings 42, 40 and lay its eggs in the water contained in the chamber -D-. The larvae which will then be produced from the eggs will swim through the side screen 39 and enter the chamber -C- to feed on the organisms in that chamber. The organisms feed on the food 20 while the mosquitoes feed on the organisms that are clustered about the food 20. In a short time the larvae will grow in size and become too large to swim back through the side screen 39 and when they have become pupae and later grown to the young adult mosquito stages, they are too large to pass through the screen 38, 39. Consequently, these mosquitoes are trapped and soon die or can be readily destroyed in order to rebait the trap 30.

It is readily appreciated from the above description taken in connection with the accompanying drawings, my mosquito traps 10, 30 can eventually do away with mosquitoes, at least in areas where these traps are used. Female mosquitoes prefer to lay her eggs in water. However, during the dry season, she will lay them in any area that is damp and promises to become a watery area. The eggs will remain unhatched until the water is forthcoming and the eggs life cycle commences. These traps 10, 30 will give the female mosquito a desirable place to lay her eggs whether in the dry or wet season. In either event, the mosquitoes that are hatched in my traps will not live to continue the propagation of mosquito life.

What I claim as new and desire to secure by Letters Patent is:

1. A mosquito trap comprising an open top receptacle for containing water and the like, a screen member mounted in substantially an upright position in said receptacle, said screen member dividing said receptacle into two chambers in side by side relation, cover means enclosing one of said chambers and food retaining means mounted in said one of said chambers remote from the other of said chambers whereby female mosquitoes are given access to that portion of said water placed in said receptacle that is positioned in said other of said chambers in order to permit them to lay their eggs thereon.

2. The structure as recited by claim 1 wherein said screen member has openings of such size to permit larvae formed from said eggs to pass from said other of said chambers to said one of said chambers but not sufficiently large to permit young adult mosquitoes to escape from said one of said chambers.

3. The structure as recited by claim 2 wherein said cover means comprises a further screen member having openings of substantially the same size as said first named screen member.

4. The structure as recited by claim 3 wherein said receptacle is substantially rectangular in shape having side walls, slotted portions mounted on said side walls in opposing relation, said first named screen member being slidably positioned in said slotted portions and said further screen member formed integrally with said first named screen member and lid means mounted over said receptacle engaging said further screen member, said lid means having an opening extending over both of said chambers.

5. The structure as recited by claim 3 wherein said receptacle has an arcuate side wall and a bottom wall, said first named screen member formed into a substantially cylindrical shape and positioned in the mid-portion of said receptacle, said further screen member extending from the top portion of said cylindrically shaped screen member to said arcuate side wall of said receptacle and means removably fastening said further screen member to said arcuate side wall.

* * * * *